US011286189B2

(12) United States Patent
Rychen et al.

(10) Patent No.: US 11,286,189 B2
(45) Date of Patent: Mar. 29, 2022

(54) TREATMENT OF FLUORIDE-CONTAINING WASTEWATER

(71) Applicant: Ovivo Inc., Montreal (CA)

(72) Inventors: Philippe Rychen, Muespach-le-haut (FR); Markus Duppel, Rutesheim (DE)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 16/770,901

(22) PCT Filed: Nov. 30, 2018

(86) PCT No.: PCT/IB2018/001369
§ 371 (c)(1),
(2) Date: Jun. 8, 2020

(87) PCT Pub. No.: WO2019/111046
PCT Pub. Date: Jun. 13, 2019

(65) Prior Publication Data
US 2020/0317553 A1  Oct. 8, 2020

(30) Foreign Application Priority Data
Dec. 6, 2017  (EP) .................................... 17205716

(51) Int. Cl.
*C02F 9/00*    (2006.01)
*B01D 61/14*   (2006.01)
(Continued)

(52) U.S. Cl.
CPC .............. *C02F 9/00* (2013.01); *B01D 61/145* (2013.01); *B01D 61/147* (2013.01); *B01D 61/16* (2013.01);
(Continued)

(58) Field of Classification Search
CPC .......... C02F 9/00; C02F 1/444; C02F 1/5236; C02F 1/66; C02F 2001/007;
(Continued)

(56) References Cited

U.S. PATENT DOCUMENTS 3,551,332 A * 12/1970 Bird ...................... C02F 1/5236
                                                     210/724
4,171,342 A    10/1979 Hirko et al.
(Continued)

FOREIGN PATENT DOCUMENTS

| EP | 2559667 | 2/2013 |
|---|---|---|
| WO | WO2011143775 | 11/2011 |
| WO | WO2014108941 | 7/2014 |

*Primary Examiner* — Joseph W Drodge
(74) *Attorney, Agent, or Firm* — Thomas M. Freiburger

(57) ABSTRACT

The invention relates to a method for treating fluoride-containing, in particular HF containing wastewater to remove fluoride and to a corresponding apparatus. In the new method calcium carbonate is reacted in a reaction step at an acidic pH≤4 with the fluoride in the wastewater to form calcium fluoride particles. Then, in a subsequent filtration step said calcium fluoride particles are separated by a porous membrane from the treated wastewater. The inventive apparatus comprises at least one reaction container/tank for reacting calcium carbonate at an acidic pH≤4 with fluoride in the wastewater to form calcium fluoride particles, as well as at least one porous membrane, in particular at least one porous ceramic membrane for separating calcium fluoride particles from the treated wastewater in a filtration step.

13 Claims, 1 Drawing Sheet

(51) Int. Cl.
*B01D 61/16* (2006.01)
*B01D 71/02* (2006.01)
*C04B 35/56* (2006.01)
*C02F 1/44* (2006.01)
*C02F 1/52* (2006.01)
*C02F 1/66* (2006.01)
*B01J 19/00* (2006.01)
*C01B 7/19* (2006.01)
*C04B 35/565* (2006.01)
*C02F 1/00* (2006.01)
*C02F 101/10* (2006.01)
*C02F 101/14* (2006.01)
*C02F 103/34* (2006.01)

(52) U.S. Cl.
CPC .......... *B01D 71/021* (2013.01); *C04B 35/565* (2013.01); *B01D 2311/04* (2013.01); *B01D 2311/18* (2013.01); *B01D 2311/2642* (2013.01); *B01J 19/00* (2013.01); *B01J 2219/2475* (2013.01); *C01B 7/19* (2013.01); *C02F 1/444* (2013.01); *C02F 1/5236* (2013.01); *C02F 1/66* (2013.01); *C02F 2001/007* (2013.01); *C02F 2101/105* (2013.01); *C02F 2101/14* (2013.01); *C02F 2103/346* (2013.01)

(58) Field of Classification Search
CPC ............ C02F 2101/105; C02F 2101/14; C02F 2103/346; C02F 1/583; C02F 1/44; C02F 1/441; C02F 1/52; B01D 61/145; B01D 61/147; B01D 61/16; B01D 71/021; B01D 2311/04; B01D 2311/18; B01D 2311/2642; B01D 2311/12; B01D 71/025; B01D 21/01; B01D 21/02; B01D 21/08; B01D 61/14; B01D 61/20; B01D 71/024; B01D 2311/263; C04B 35/565; B01J 19/00; B01J 19/18; B01J 2219/2475; C01B 7/19; C01F 7/50

See application file for complete search history.

(56) References Cited

U.S. PATENT DOCUMENTS

| | | | |
|---|---|---|---|
| 4,657,680 A | 4/1987 | Zibrida | |
| 4,698,163 A | 10/1987 | Zibrida | |
| 5,043,072 A * | 8/1991 | Hitotsuyanagi | B01D 61/147 210/638 |
| 5,895,576 A * | 4/1999 | Yamasaki | C02F 1/583 210/614 |
| 6,003,279 A * | 12/1999 | Schneider | E04B 1/0046 403/230 |
| 6,063,279 A * | 5/2000 | Yamasaki | C02F 3/308 210/605 |
| 6,331,256 B1 | 12/2001 | Kezuka et al. | |
| 2002/0113023 A1* | 8/2002 | Krulik | C02F 1/5245 210/749 |
| 2003/0160003 A1* | 8/2003 | Maree | C02F 1/64 210/724 |
| 2011/0127223 A1* | 6/2011 | Astley | C02F 1/66 210/712 |
| 2011/0293506 A1* | 12/2011 | Tanida | C01B 33/24 423/490 |
| 2011/0309017 A1* | 12/2011 | Hassler | B01J 49/07 210/638 |
| 2013/0062289 A1* | 3/2013 | Cote | B01D 61/022 210/723 |
| 2013/0075335 A1* | 3/2013 | Prakash | B01D 61/364 210/640 |
| 2014/0161714 A1* | 6/2014 | Wang | C02F 1/583 423/490 |
| 2014/0231359 A1* | 8/2014 | Cote | C02F 1/60 210/710 |
| 2019/0276342 A1* | 9/2019 | Izawa | C02F 1/62 |

* cited by examiner

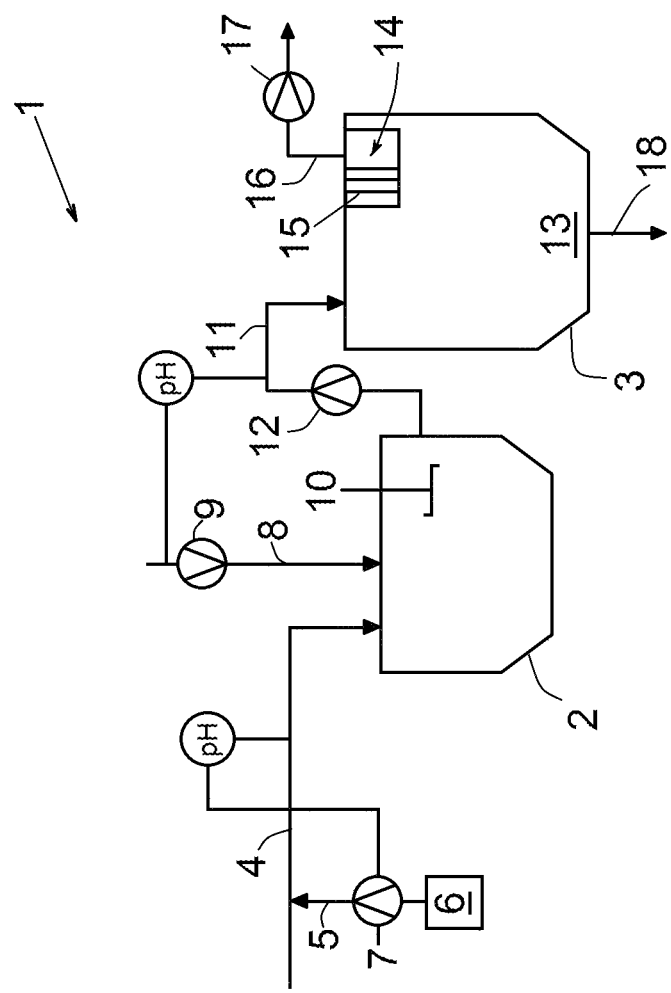

TREATMENT OF FLUORIDE-CONTAINING WASTEWATER

BACKGROUND OF THE INVENTION

This application claims priority from European application number EP 17205716.8, filed Dec. 6, 2017, and is a national filing of PCT/IB2018/001369.

This invention relates to a method for treating fluoride-containing, in particular hydrofluoric acid (HF) containing wastewater to remove fluoride, and to a corresponding apparatus.

Fluoride is used to a very high extent in industry, especially in the semiconductor and nanotechnology industries as an etchant for different materials, e.g. for glass and silica. In this context, the most common source of fluoride is HF. Also buffered HF (BHF), containing e.g. ammonium bifluoride is used.

As higher doses of free fluorides can be harmful to humans and other lifeforms, it is essential to remove fluoride from industrial wastewater streams. Many different methods are known in this context, e.g. fluoride reduction via alumina or ion exchange.

Another known method for fluoride removal is precipitation of fluoride as calcium fluoride ($CaF_2$). Here, it is known to produce $CaF_2$ granules by adding granules of limestone (calcium carbonate) to the HF containing wastewater (calcite method), or to crystallize $CaF_2$ by using calcium aqueous agents such as hydrated lime and calcium chloride solution in HF wastewater treatment (crystallization method).

Nevertheless, the still most common method for HF wastewater treatment is the so-called precipitation/coagulating/flocculation sedimentation technique. In this method hydrated lime (calcium hydroxide $Ca(OH)_2$) is typically used as the calcium source for forming $CaF_2$. However, as the generated $CaF_2$ is formed as a fine powder and is suspended in the resulting solution, it is necessary to use coagulants for providing $CaF_2$ in a coagulated, manageable form. This results in a comparably high "footprint", e.g. as the coagulated $CaF_2$ has little value as a resource due to its high content of impurities resulting e.g. from the used coagulants and flocculants.

Therefore, there is need for an amended method for treating fluoride, in particular HF containing wastewater in which, on the one hand, fluoride is reacted into $CaF_2$ with high reliability, preferably at low cost, and on the other hand, there is a small "footprint", e.g. the method is characterized by low energy use and by low consumption of chemical compounds and additives.

To fulfill this need the invention provides a method for treating fluoride-containing, in particular HF-containing wastewater to remove fluoride with the features of claim 1. An apparatus suitable for this treatment is claimed in claim 10. Preferred embodiments of the inventive method and of the inventive apparatus are defined in the claims dependent from claim 1 and dependent from claim 10, respectively. The wording of all claims is hereby explicitly incorporated into this description by reference.

According to the invention, in a method mentioned above calcium carbonate is reacted in a reaction step at an acidic pH≤4 with the fluoride, in particular the hydrofluoric acid in the wastewater to form calcium fluoride particles. Then, in a subsequent step said calcium fluoride particles are separated by filtration via a porous membrane from the treated wastewater.

According to the invention, the term "wastewater" shall mean any water-based liquid which has to be cleaned or recycled.

The term "membrane" shall include any synthetic membrane which is intended for separation purposes in laboratory or in industry. Those membranes are used to selectively retain substances, and to let pass other substances.

Synthetic membranes can be made from a large number of different materials. They can be produced from organic materials, in particular from polymers. Membranes made from inorganic materials are often ceramic membranes, produced from inorganic materials such as aluminium oxides, zirconium dioxides or silicon carbide. Those ceramic membranes normally are stable against aggressive chemicals, like acids or certain solvents. Further they are thermally and mechanically stable, and normally biologically inert.

The membranes used according to the invention are porous, wherein the degree of selectivity of the membrane depends on the pore size. Depending on this pore size, the membranes can be classified as microfiltration membranes, ultrafiltration membranes or nanofiltration membranes. Normally, according to the invention, flat and comparably thin membranes are used.

The term "cutoff" shall describe the pore size of the membrane and it reflects to the maximum pore size distribution. With a pore size greater than 0.1 μm (and lower than 10 μm) globular molecules greater than 5000 kDa are retained by the membrane to 90%. This pore size range is the typical scope of microfiltration.

In the formation of the calcium fluoride particles calcium carbonate particles act as a seed material on which the calcium fluoride particles grow. During the reaction step and the corresponding growth of the calcium fluoride particles not only calcium carbonate of the reaction solution, but also calcium carbonate in the core of the growing particles is consumed. This results in a considerable number of comparably big particles of calcium fluoride, mostly with a remaining calcium carbonate core.

Also present in the reaction solution are small particles of calcium fluoride which mainly do not result from a reaction on calcium carbonate seed particles. Both the bigger calcium fluoride particles and the smaller calcium fluoride particles are separated in the subsequent filtration step according to the invention by a porous membrane from the treated wastewater. This results in a filtrated wastewater with a low content of fluoride, being the permeate of the filtration step.

The treated wastewater (permeate of the filtration step) can be further recycled by additional post-treatment steps like ion exchange, electrodialysis reversal (EDR), membrane capacitive deionization, or reverse osmosis, in order to recycle back to process or to use the treated wastewater after demineralization for other purposes as e.g. cooling tower purposes.

In a preferred embodiment the inventive method is characterized by a settling step before the filtration step. In this additional settling step at least a part of the calcium fluoride particles formed in the reaction step are allowed to settle. As explained above this settled part of calcium fluoride particles will mainly consist of bigger calcium fluoride particles formed during the reaction step. Due to the settling it is not necessary to bring those already settled particles to the membrane for filtration. Only smaller calcium fluoride particles which did not settle in the settling step have to be separated from the treated wastewater.

In principle, it is possible to support the settling of calcium fluoride particles by applying a suitable force, e.g. by centrifugation. However, normally according to the invention those particles are allowed to settle simply by gravitational force. No further chemicals or coagulants are needed.

As already mentioned the membrane can be chosen with a pore size adapted to the specific requirements. Here, it is possible with advantage to use an ultrafiltration membrane with a cutoff preferably chosen from about 0.02 µm to about 0.1 µm. It is however preferred according to the invention that the membrane used is a microfiltration membrane with a cutoff chosen from about 0.1 µm to about 10 µm. Within this cutoff range values from about 0.1 µm to about 1 µm are further preferred.

Due to their chemical stability against the acidic conditions in the reaction step of the inventive method it is further preferred that the membrane used is a ceramic membrane. Such a ceramic membrane is preferably made from aluminium oxide, titanium dioxide, zirconium dioxide or silicon carbide. Silicon carbide (SiC) membranes are most preferred, because they have the lowest fouling behavior, the highest permeability, and the highest chemical and physical stability. During "fouling" the outer and inner surfaces of the membrane will be covered by unwanted material (inorganic or organic or by living organisms). Ceramic membranes, in particular SiC membranes have a high resistance against such fouling. For cleaning procedures, any chemicals can be used as SiC-membranes are highly resistant against most chemicals.

The reaction between calcium carbonate and fluoride in the wastewater is working properly at clearly acidic conditions, namely at a pH value of ≤4. In this context it is preferred if the pH value is ≤3.5. Working under even more acidic conditions, namely a pH value≤2.5 is most preferred.

During the reaction step the pH value of the wastewater will rise, normally into a low acidic range of e.g. 5 to almost 7.

Normally a fluoride-containing, in particular HF containing wastewater from the semiconductor industry will already have a pH value≤4, and even ≤2.5. If the pH value of the wastewater to be treated is not within the necessary range of ≤4, or not within the more preferred ranges, it is possible to add any acidic liquid to the wastewater prior to the reaction step. In this context it is preferred to add a mineral acid, namely hydrochloric acid, or preferably sulphuric acid or nitric acid. Any acidic wastewater can also be used.

In the inventive method, it is preferred to use calcium carbonate as a powder, i.e. to add calcium carbonate to the wastewater in powder form. This powder preferably has an average particle size≤1 mm, wherein an average particle size of ≤0.1 mm is further preferred. The term "average particle size" in this context refers to the so-called D90 value, defining that 90% of the particles are smaller as the corresponding value, e.g. 1 mm. In the case of calcium carbonate this D90 value can be determined by sieve analysis.

In another preferred embodiment of the inventive method calcium carbonate can be used in a slurry, i.e. this slurry containing calcium carbonate (normally in water) can be added to the wastewater. The slurry is a mixture of particulate calcium carbonate, which is insoluble in water.

It is preferred according to the invention that the concentration of the calcium carbonate particles in the slurry is up to 50%. Further preferred is a concentration of calcium carbonate particles in the slurry of up to 30%.

Under normal circumstances, calcium carbonate (as a powder or as a slurry) can be added quickly to the wastewater for starting and performing the reaction between calcium carbonate and the fluoride in the wastewater. If acids other than HF, e.g. hydrochloric acid or nitric acid or other acids are present in the wastewater, it could be useful to adapt the calcium carbonate dosing rate. It could even be helpful to control the pH value during calcium carbonate dosing and/or during the whole reaction step by pH measurement.

As explained above, during the reaction calcium carbonate is not only the reaction/precipitation partner of the fluoride, but also acts as seed material for the growth of the calcium fluoride particles. As a consequence, it is preferred in the inventive method to use calcium carbonate in excess to the fluoride content of the wastewater. In these embodiments the calcium carbonate/fluoride mass ratio is preferably more than 2, preferably from 2.6:1 to 5:1. In the latter range a calcium carbonate/fluoride mass ratio from 3.5:1 to 4.2:1 is further preferred.

The excess of calcium carbonate can also depend on the fact whether phosphoric acid is present in the wastewater. In the presence of phosphoric acid ($H_3PO_4$) calcium phosphate ($Ca_3(PO_4)_2$) or apatite/hydroxyfluoroapatite ($Ca_{10}(PO_4)_6F_2$) will co-precipitate with calcium fluoride. This calcium consumption by co-precipitation should be considered in the chosen calcium carbonate/fluoride mass ratio.

In this case, the pH should be increased by adding any alkalinity (i.e NaOH) to pH>7.5, preferably >8.0 to fully precipitate and remove at same time the phosphates from water.

In the inventive method, the reaction time (reaction between calcium carbonate and fluoride in the reaction step) depends on the fluoride/HF content of the (feed) wastewater on the one hand, and on the desired target content of fluoride/HF in the treated wastewater on the other hand.

Starting from a (untreated) wastewater with a fluoride content between 500 ppm and 1000 ppm and a target fluoride content in the treated wastewater between 20 ppm and 10 ppm, the reaction time in the reaction step of the inventive method regularly will be less than 120 minutes, in particular less than 90 minutes (inventive treatment performed at room temperature, i.e. between 15° C. and 30° C., preferably under stirring/mixing).

However, according to the inventive method it is preferred that the reaction time under mixing is from 5 minutes to 60 minutes, in particular from 20 minutes to 40 minutes.

Accordingly, a most preferred embodiment of the inventive method is characterized by a reaction step in which calcium carbonate is reacted with the fluoride in the wastewater at an acidic pH≤2.5 for a reaction time between 5 minutes and 60 minutes. During this reaction step calcium carbonate particles act as a seed material for the growth of calcium fluoride particles. These particles continue to grow and form big particles which settle from the wastewater as heavy sediments. The (inner) core of the calcium fluoride particles remains as calcium carbonate. Finer and lighter (smaller) particles are also formed by the reaction and remain in the wastewater (they do not settle) or even move upwards in the wastewater. These lighter and smaller particles are filtered in a subsequent filtration step by a porous membrane from the treated wastewater. This porous membrane preferably is a ceramic membrane suited for microfiltration. It is most preferred if this ceramic membrane is made from silicon carbide (SiC).

Further, the present invention also comprises an apparatus for treating fluoride-containing, in particular HF-containing wastewater to remove fluoride.

This inventive apparatus comprises at least one reaction container or reaction tank (in the following jointly designated as reaction tank) for reacting calcium carbonate at an acidic pH≤4 with fluoride in the wastewater to form calcium fluoride particles. Further, the inventive apparatus comprises at least one porous membrane, in particular at least one porous ceramic membrane for separating calcium fluoride particles from the treated wastewater in a filtration step.

Relating to the terms used in defining the inventive apparatus it is referred to the above definitions for the inventive method.

With advantage, the at least one porous membrane in the inventive apparatus can be arranged in a separate filtration container or separate filtration tank (in the following jointly designation as filtration tank). With such an inventive apparatus the wastewater treated in the reaction step in the reaction tank will be transferred after this reaction step into the filtration tank.

With advantage, the inventive apparatus can additionally comprise at least one separate settling container or separate setting tank (in the following jointly designated as settling tank) for settling of calcium fluoride particles. As explained in context with the inventive method these calcium fluoride particles can preferably be settled before separating calcium fluoride particles from the treated wastewater by the porous membrane being part of the inventive apparatus.

According to the invention it is further preferred if the inventive apparatus comprises a combination container or combination tank (in the following jointly designated as combination tank) both for settling of calcium fluoride particles (formed in the reaction step) and for separating calcium fluoride particles from the treated wastewater. This has the advantage that both process steps, namely the settling of the calcium fluoride particles, and the separation of the calcium fluoride particles from the treated wastewater can be performed in one tank.

Further, the inventive apparatus advantageously can additionally comprise at least one device for adding at least one acid or at least one acidic solution to the wastewater, prior to reacting calcium carbonate with fluoride in the reaction tank to form calcium fluoride particles. As explained in context, with the inventive method this additional device can be necessary or helpful in adjusting the pH value of the untreated (feed) wastewater.

In a preferred embodiment of the inventive apparatus the membrane being part of said apparatus is a microfiltration/ultrafiltration membrane with a cutoff from about 0.021 μm to about 10 μm, preferably from about 0.1 μm to about 1 μm. In this context reference is made to the corresponding disclosure relating to the inventive method.

In a preferred embodiment of the inventive apparatus, the ceramic membrane being part of said apparatus is made from aluminium oxide, titanium dioxide, zirconium dioxide or silicon carbide, in particular made from silicon carbide.

The inventive method and the inventive apparatus is associated with a number of advantages. The inventive combination of method steps and apparatus components results in a ($CaF_2$—) sludge (retentate of the filtration step) which can be reclaimed for HF production.

As the membrane used in the filtration step is an absolute physical barrier, there is a complete removal of suspended solids.

Due to the short reaction times at room temperature in the reaction step, and due to the fact that no coagulants and other chemicals have to be used, the inventive method has a very compact footprint.

Finally, the inventive method has low cost due to the use of calcium carbonate which is the cheapest calcium source for the formation of calcium fluoride.

Further advantages and features of the overall invention will become clear from the following description of the drawing and the example in conjunction with the dependent claims. The individual features can be realized either singly or jointly in combination in one embodiment of the invention. The drawing and the example only serve for illustration and better understanding of the invention and are not to be understood as in anyway limiting the invention.

The drawing schematically shows:

FIG. 1: An inventive apparatus which can be used for the inventive method.

FIG. 1 shows an inventive apparatus 1 in a schematic representation. Apparatus 1 comprises a reaction tank 2 and a combination tank 3, in which the settling of $CaF_2$ particles and the separation of $CaF_2$ particles from the treated wastewater can take place.

Further, FIG. 1 shows a supply line 4 for supplying (untreated) HF containing wastewater to the reaction tank 2. If necessary or if appropriate acid can be supplied from a tank/device 6 to the (feed) wastewater via supply line 5 and pump 7. The possibility to measure and control the pH value of the untreated wastewater in line 4 is also illustrated.

$CaCO_3$ can be added to the wastewater in the reaction tank 2 (as a powder or a slurry) via supply line 8 and pump 9.

Further possible details of the reaction tank 2 are not shown. Only a stirrer 10 which can be used during the reaction step is shown as an option.

Further, FIG. 1 shows a supply line 11 for transferring the wastewater treated in reaction tank 2 via pump 12 into combination tank 3. It is also illustrated that the pH value of the treated wastewater in line 11 can be measured and controlled.

In combination tank 3, in its bottom part there is a zone 13 in which $CaF_2$ particles can settle from the treated wastewater transferred from reaction tank 2 into combination tank 3.

In the upper part of combination tank 3 a filtration system 14 comprising at least one porous membrane 15 is shown. Treated wastewater containing $CaF_2$ particles which have not settled into the bottom part of combination tank 3, in particular into zone 13, is filtrated through these membranes 15 via pump 17 (creating (moderate) suction pressure), resulting in a clean treated wastewater stream discharged from combination tank 3 via line 16. $CaF_2$ particles retained from membranes 15 and $CaF_2$ particles already settled in combination tank 3 can be discharged from combination tank 3 via line 18.

EXAMPLE

In this example industrial HF containing wastewater from a semiconductor factory was used as feed water for performing the inventive method in an inventive apparatus.

For this purpose 100 liter (L) wastewater were collected and mixed. By measurement with an ISE (Ion Sensitive Electrode) the following data for this (feed) wastewater are provided:

pH=2.4
Fluoride content: 950 ppm
Temperature: 28° C.

This 100 L volume was transferred as a batch into the reaction tank. Then, to this batch 380 gram (gr) dry solid $CaCO_3$ powder (97%; grain size D90<0.1 mm) was added. This addition occurred in less than one minute under strong mixing with a stirrer.

The reaction time in the reaction step (under constant stirring) was set to be 30 minutes.

Then, the resulting batch of treated wastewater was transferred into the combination tank. This combination tank was equipped with SiC microfiltration membranes (cutoff 0.1 µm) with a (total) active surface of 5 dm². In this design the filtration was run as a submerged atmospheric filtration system wherein the permeate was drawn through the pores by using gentle suction. Bigger $CaF_2$ particles formed in the reaction step settled down to the bottom of the combination tank. Smaller $CaF_2$ particles went up and were subjected to filtration.

In this example, the filtration capacity was set at 30 L/hour (h) with a regular backwash, namely every 10 minutes during 30 seconds under fully automatic procedure. The filtration performance was constant with a varying transmembrane pressure (TMP) between 250 mbar after backwash and 450 mbar before backwash. No pre-acidification was needed as the optimal pH-value of <2.5 was already achieved from the wastewater composition. During the reaction time of 30 minutes the pH raised to 5.8.

The analytical results after a total filtration time of 3 hours were as follows.
Treated wastewater: Fluoride content: 7 to 10 ppm
pH: 6.5 to 7.5
Turbidity: <0.5 NTU (Nephelometric Turbidity Unit)
TSS (Total Suspended Solids): <1 ppm
Produced crystals (analyzed by XRD (X-ray Diffraction)):
60% $CaF_2$
35% $CaCO_3$ (mainly from core of particles)
5% impurities
>80% crystallinity and <20% amorphous structure.

The invention claimed is:

1. Method for treating HF-containing wastewater to remove fluoride in a crystalline process, wherein
at an acidic pH≤4 calcium carbonate ($CaCO_3$) is reacted in a reaction step with the fluoride in the wastewater to form crystalline calcium fluoride ($CaF_2$) particles, and
in a subsequent filtration step said $CaF_2$ crystalline particles are separated by a porous ceramic membrane from the wastewater,
the $CaCO_3$ in the process performing three distinct functions: (1) neutralization of acidity by carbonate; (2) providing calcium for $CaF_2$ crystallization; and (3) providing seed material for crystallization.

2. Method according to claim 1 characterized by a settling step before said filtration step, wherein at least a part of said $CaF_2$ particles formed in said reaction step are allowed to settle.

3. Method according to claim 1, characterized in that said membrane is a microfiltration membrane with a cutoff from about 0.1 µm to about 1 µm.

4. Method according to claim 1, characterized in that said ceramic membrane is made from aluminium oxide ($Al_2O_3$), titanium dioxide ($TiO_2$), zirconium dioxide ($ZrO_2$), or silicon carbide (SiC).

5. Method according to claim 1, characterized in that $CaCO_3$ is reacted with the fluoride at an acidic pH≤3.5.

6. Method according to claim 1, characterized in that the $CaCO_3$ is introduced to the wastewater as a powder with an average particle size≤0.1 mm.

7. Method according to claim 1, characterized in that $CaCO_3$ is present as a slurry.

8. Method according to claim 1, characterized in that $CaCO_3$ is used in excess to the fluoride content of the wastewater at a $CaCO_3$/fluoride mass ratio of 2.6 to 5.

9. Method according to claim 8, characterized in that the wastewater further includes phosphoric acid, and the method further including, after the reaction step, adding alkalinity to increase the pH to over 7.5, to fully precipitate phosphates.

10. Method according to claim 1, characterized in that $CaCO_3$ is reacted with the fluoride for a reaction time of from 20 minutes to 40 minutes.

11. Method according to claim 10, characterized in that the wastewater further includes phosphoric acid, and the method further including adding alkalinity to increase the pH to over 7.5, to fully precipitate phosphates.

12. Method according to claim 1, characterized in that the wastewater further includes phosphoric acid, and the method further including, after the reaction step, adding alkalinity to increase the pH to over 7.5, to fully precipitate phosphates.

13. Method according to claim 12, characterized in that the addition of alkalinity raises the pH to over 8.0.

* * * * *